March 2, 1948.  F. L. VAN WEENEN ET AL  2,436,908
FLEXIBLE CONNECTING ROD
Filed Sept. 4, 1945  2 Sheets-Sheet 1

INVENTORS
FRANCISCUS LAMBERTUS VAN WEENEN
WILLEM HENDRIK STITGER
BY E. F. Wenderoth
ATTORNEY March 2, 1948. F. L. VAN WEENEN ET AL 2,436,908
FLEXIBLE CONNECTING ROD
Filed Sept. 4, 1945 2 Sheets-Sheet 2

INVENTORS
FRANCISCUS LAMBERTUS VAN WEENEN
WILLEM HENDRIK STITGER
BY E. F. Wenderoth
ATTORNEY Patented Mar. 2, 1948

2,436,908

UNITED STATES PATENT OFFICE 2,436,908

FLEXIBLE CONNECTING ROD

Franciscus Lambertus Van Weenen and Willem Hendrik Stigter, Eindhoven, Netherlands, assignors to Hartford National Bank & Trust Co., Hartford, Conn., as trustee Application September 4, 1945, Serial No. 614,348
In the Netherlands February 3, 1943

Section 1, Public Law 690, August 8, 1946
Patent expires February 3, 1963

8 Claims. (Cl. 309—17)

A device is known comprising a rectilinear reciprocating body, such as a piston or a crosshead, and a driving mechanism such as a crank or a wobbler mechanism, which are relatively connected by means of a driving rod. In this case the driving rod is pivotally coupled to both the driving mechanism and the reciprocating body, which articulated coupling permits the driving rod to rotate relatively to the reciprocating body. The articulated coupling between the driving rod and the driving mechanism, crank or wobble-disc, is effected in the so-called big end of the driving rod and that between the driving rod and the reciprocating body in the small end.

In definite cases, however, it is difficult to secure the reciprocating body to the driving rod by means of a pivot. This pivot point is often almost inaccessible or is at high temperature so that the lubrication of this point causes difficulty. It is also possible that the specific load of this pivot point is so high that this pivot can be difficultly housed in the space intended thereto.

The construction according to the invention purports to obviate these drawbacks.

The device according to the invention exhibits the characteristic that the small end of the driving rod is resiliently coupled to the reciprocating body. This resilient connection may be established either by means of a separate resilient member, or by means of a resilient part of the driving rod located between the big end and the reciprocating body. A pivot-point between the driving rod and the reciprocating body has thus become superfluous, so that all the trouble which may be involved by such a pivot point is avoided.

According to one form of construction of the above-mentioned device, the resilient connection may be constituted by that the extremity of the driving rod which is remote from the big end is enclosed in a recess of the reciprocating body through the intermediary of a filling consisting of rubber. In this case the movement of the driving rod relatively to the reciprocating body takes place in the rubber filling.

According to another form of construction of this device, the resilient connection may be constituted by at least one member which exists between the big end of the driving rod and the reciprocating body and whose bending strength in a direction normal to the centre line of the driving rod is smaller than the bending strength of the driving rod itself in this direction. This reduced bending strength may be obtained by giving the section of the said member in a plane normal to the centre line of the driving rod smaller dimensions than the section of the driving rod in a corresponding plane, or by manufacturing the said member from a material which at equal external load per unit of section, bends to a greater extent than the material constituting the driving rod.

When use is made of a member having locally a smaller cross-section, then in many cases it suffices to utilize such a shape of this section that the dimension of this section is smaller than that of the driving rod only in the direction in which the driving rod moves relatively to the reciprocating body. Even in those cases in which the resilient member does not exist as a separate constructional element but is constituted by a locally narrowed portion of the driving rod, this narrowing need only take place in the direction in which the driving rod moves relatively to the piston or the cross-head. In those cases in which a movement occurs in a plurality of directions, such, for example, as with the driving of a wobbler-mechanism the extremities of which perform a spatially lemniscate-shaped movement, it will in many cases be preferred to provide several local narrow portions, each for a direction of movement of its own, instead of a single re-entrant part which allows movement in any direction. In the first case the total section is not decreased as much, so that the tensile and compressive stresses occurring in the driving rod do not increase excessively.

In order that the invention may be more clearly understood and readily carried into effect it will be described more fully by reference to the accompanying drawings.

Figure 1:
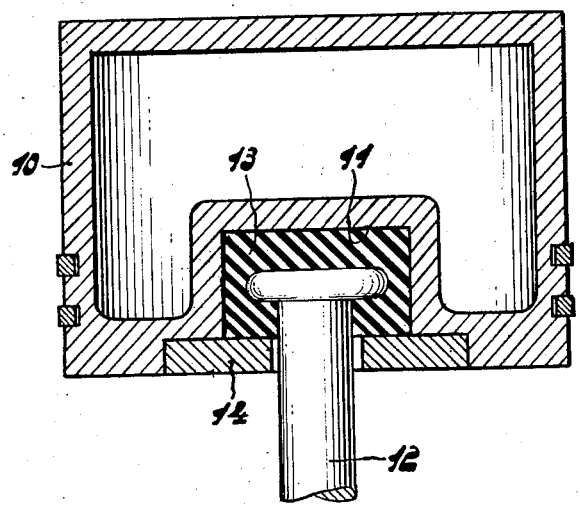
Fig. 1 shows a view, partly in section, of one form of the invention.

Fig. 1 shows a form of construction of the piston and of the associated driving rod used in a device according to the invention. The piston 10 exhibits at its bottom end a recess 11 which is closed by means of a little plate 14 secured to the piston and which encloses the button-shaped top end of the driving rod 12 through the intermediary of a rubber filling 13. This filling permits a rotation of the driving rod 12 relatively to the piston 10 without a pivot being required therefor.

Figure 2:
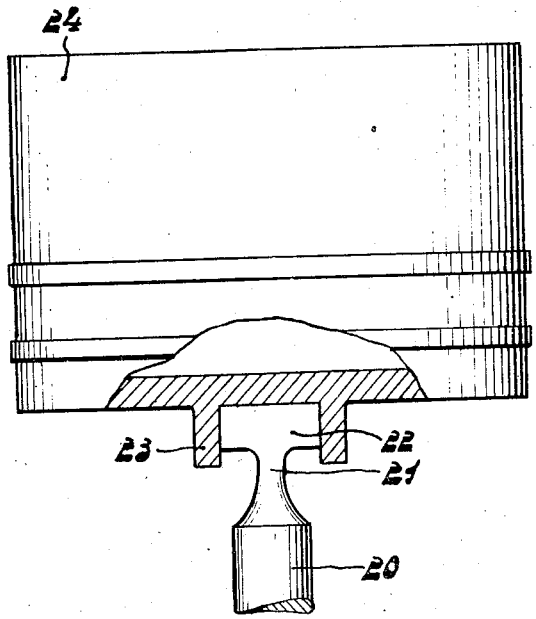
Fig. 2 shows a view, partly in section, of another form of the invention.
Figure 3:
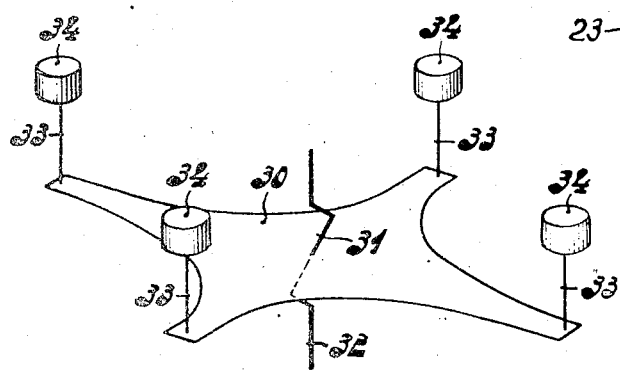
Fig. 3 shows, diagrammatically, the arrangement of the pistons of this invention with a wobbler plate and crankshaft.

In this form of construction of the device according to the invention the fastening of the piston to the driving rod is itself resilient, whereas Figs. 2 and 3 show forms of construction in which the driving rod itself in the vicinity of the point where it is fastened to the piston exhibits one or more elements which bend more easily than the remaining portion of the driving rod.

Figure 2A:
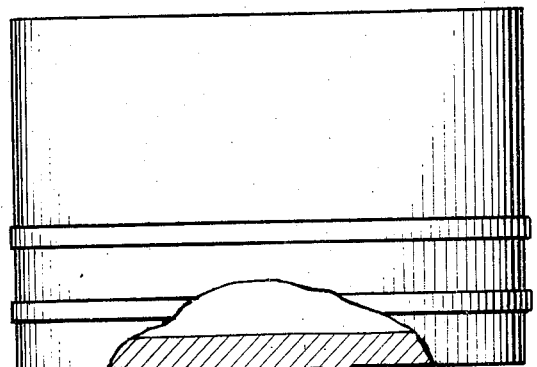
Fig. 2a shows a view, partly in section, of a modification similar to Fig. 2.

In the form of construction shown in Fig. 2 the driving rod 20 comprises a greatly thinned portion 21 connecting the lower part of the driving rod 20 to the upper part 22 thereof. This upper part is secured, for example by soldering, in a cylindrical projection 23 of the piston 24. The element 21 permits a resilience of the driving rod which is such that the bottom end thereof can follow the movement of the associated driving mechanism. When this driving mechanism is constituted by a rotary crank so that the driving rod has to make deflections in only one plane, for example the plane of drawing, the element 21 will have to be thinned only in the plane of drawing so that in the plane normal to the plane of drawing it will exhibit a diameter equal to that of the driving rod itself. If, however, the driving rod 20 is coupled to a driving mechanism, as the wobbler mechanism shown in Fig. 3, in which case the wobble-disc 30 is secured to a crank shaft 32 comprising a Z-shaped portion 31, then the lower extremities of the driving rods 33 of the pistons 34 must describe spatially lemniscate-shaped paths, so that a possibility of movement of the driving rods in more than one plane is necessary. To this end, the element 21 may be given the shape of a body of revolution, so that the profile shown in Fig. 2 constitutes the meridian section thereof. Although the resilient element may be given the shape of a cylinder having a straight line as a generatrix as shown at 21a in Fig. 2a, it is in particular with high piston loads advisable that the resilient element 21 at the side adjacent to the piston should be given a smaller diameter than at the side adjacent to the driving mechanism, as is shown at 21 diagrammatically in Fig. 2.

Figure 4:
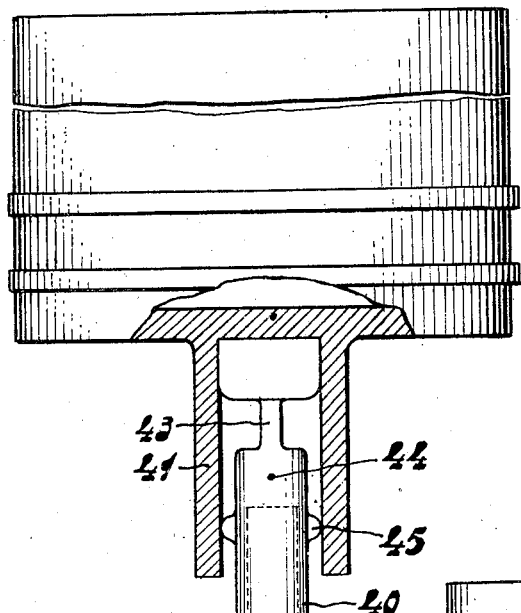
Fig. 4 shows a view, partly in section, of still another modification.

Fig. 4 shows a form of construction in which the driving rod 40, which is made hollow in the vicinity of its point of fastening in the cylindrical projection 41, of the piston 42, comprises two elements 43 and 44 respectively, which are greatly narrowed relatively to the driving rod and whose smallest dimensions jointly enclose an angle and are in this case normal to each other. From the figure it is seen that in the element 43 the smallest dimension is normal to the plane of the drawing, whereas the smallest dimension of the element 44 lies in the plane of the drawing. In general the greatly narrowed elements will be arranged relatively to the driving rod in such manner that their smallest transverse dimensions are normal to those planes in which that extremity of the driving rod which is adjacent to the driving mechanism must perform the largest deflections. However, in view of the loads of the driving rod it is in some cases advantageous to choose a different arrangement for the smallest transverse dimensions of these greatly narrowed elements. Similarly to Fig. 2, the driving rod is secured in the piston. To avoid the danger of bending of the driving rod, it may be supported by means of spherical projections 45 arranged in transverse direction through the extremity of the cylindrical projection 41.

What we claim is:

1. A device comprising a rectilinear reciprocating body, a driving mechanism, a driving rod comprising a substantially rigid portion interposed between the reciprocating body and the driving mechanism, and a substantially flexible member interposed between said rigid portion and said body, said flexible member constituting a resilient coupling between said rigid portion and said reciprocating body having a degree of movement at right angles to the axis of said rod and having a second degree of movement at right angles to the axis of the rod and at right angles to the said first degree of movement.

2. A device comprising a rectilinear reciprocating body, a driving mechanism, a driving rod comprising a substantially rigid portion interposed between the reciprocating body and the driving mechanism, and a substantially flexible member interposed between said rigid portion and said body, said flexible member constituting a resilient coupling between said rigid portion and said reciprocating body having two mutually perpendicular degrees of movement each substantially at right angles to the axis of said rod.

3. A device comprising a rectilinear reciprocating body, a driving mechanism and a driving rod interposed between the reciprocating body and the driving mechanism, said rod comprising a substantially rigid metal portion and a substantially flexible metal portion interposed between said rigid portion and said body, said flexible portion constituting a resilient coupling between said rigid portion and said reciprocating body having a degree of movement at right angles to the axis of said rod and having a second degree of movement at right angles to the axis of the rod and at right angles to the said first degree of movement.

4. A device comprising a rectilinear reciprocating body, a driving mechanism, a driving rod comprising a substantially rigid metal portion interposed between the reciprocating body and the driving mechanism, and a resilient metal coupling member interposed between said rigid portion and said body, said resilient coupling member comprising a second portion of said rod having smaller cross-sectional dimensions than said rigid portion and having a degree of movement at right angles to the axis of said rod and having a second degree of movement at right angles to the axis of the rod and at right angles to the said first degree of movement.

5. A device comprising a rectilinear reciprocating body, a driving mechanism, a driving rod comprising a substantially rigid metal portion interposed between the reciprocating body and the driving mechanism, and a resilient metal coupling member interposed between said rigid portion and said body and comprising a second portion of said rod, said coupling member having two mutually perpendicular degrees of movement at right angles to the axis of the rod and comprising two substantially flat segment elements arranged in superposition, said segments being arranged with their respective major flat surfaces perpendicular to each other and substantially parallel to the axis of the said rod.

6. A device comprising a rectilinear reciprocating body, a driving mechanism, a driving rod comprising a substantially rigid metal portion interposed between the reciprocating body and the driving mechanism, and a resilient metal coupling member interposed between said rigid portion and said body and having two mutually perpendicular degrees of movement at right angles to the axis of the rod and comprising a cylindrical segment portion of said rod having a diameter smaller than the smallest overall cross-sectional dimension of said rigid portion.

7. A device comprising a rectilinear reciprocating body, a driving mechanism, a driving rod comprising a substantially rigid metal portion interposed between the reciprocating body and the driving mechanism, and a resilient metal coupling member interposed between said rigid portion and said body, having two mutually perpendicular degrees of movement at right angles to the axis of the rod and comprising a conical segment portion of said rod having its larger diameter smaller than the smallest overall cross-sectional dimension of said rigid portion, said segment portion being arranged with its larger diameter adjacent to the said rigid portion.

8. A device comprising a rectilinear reciprocating body, a driving mechanism and a driving rod interposed between the reciprocating body and the driving mechanism, said rod comprising a substantially rigid metal portion having a radially extending projection and a substantially flexible metal portion interposed between said rigid portion and said body, said flexible portion constituting a resilient coupling between said rigid portion and said reciprocating body having two mutually perpendicular degrees of movement at right angles to the axis of said rod, said reciprocating body comprising an annular portion surrounding said coupling and extending beyond the end thereof and beyond said radially extending projection.

FRANCISCUS LAMBERTUS VAN WEENEN.
WILLEM HENDRIK STIGTER.

REFERENCES CITED

The following references are of record in the file of this patent:

UNITED STATES PATENTS

| Number | Name | Date |
| --- | --- | --- |
| 722,146 | Robertson | Mar. 3, 1903 |
| 891,993 | Hess | June 30, 1908 |